Oct. 21, 1941.  A. M. BARROW  2,259,791
COW TAIL HOLDER
Filed March 26, 1940  2 Sheets-Sheet 1
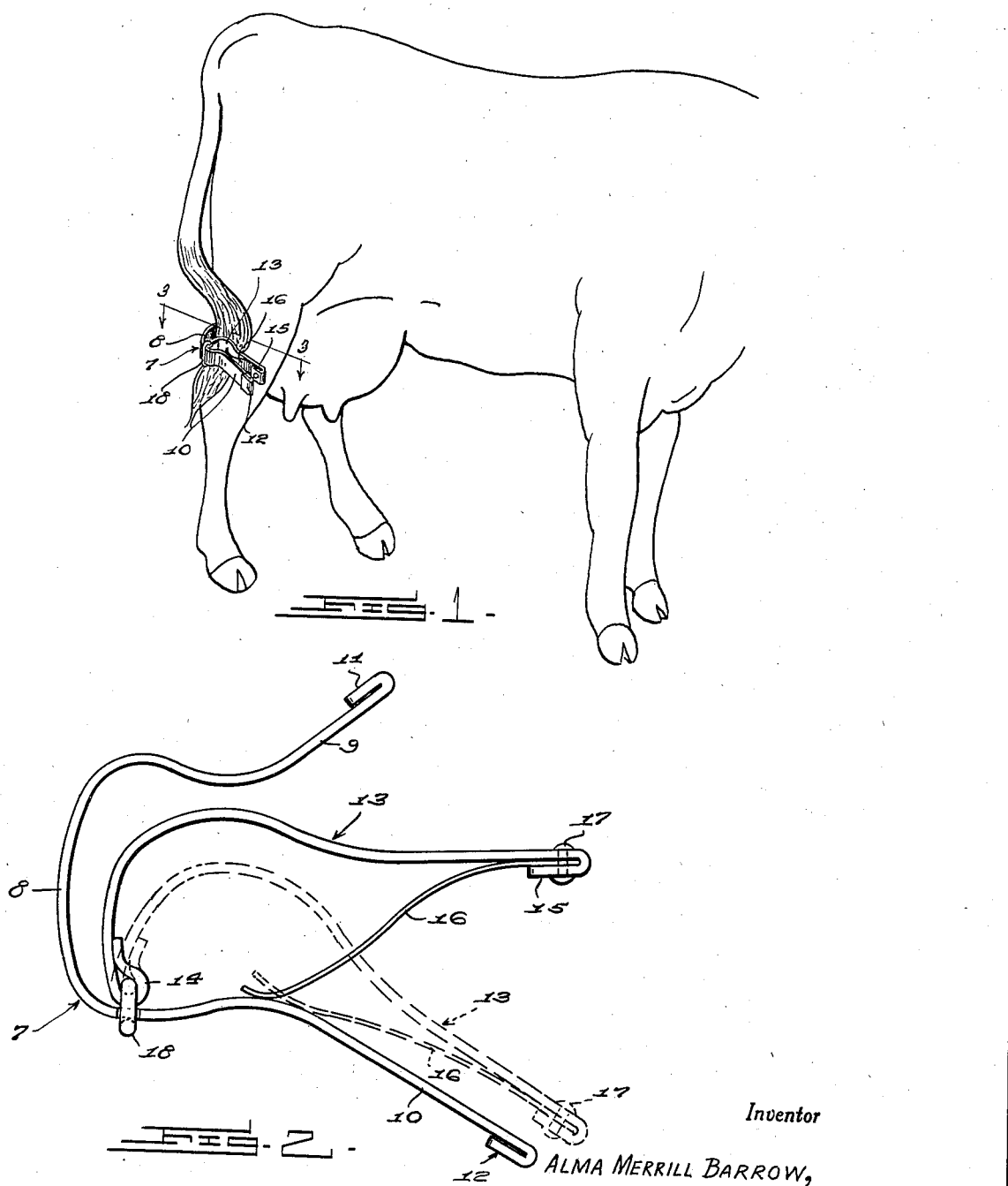
Inventor
ALMA MERRILL BARROW,
By Clarence A. O'Brien
Attorney

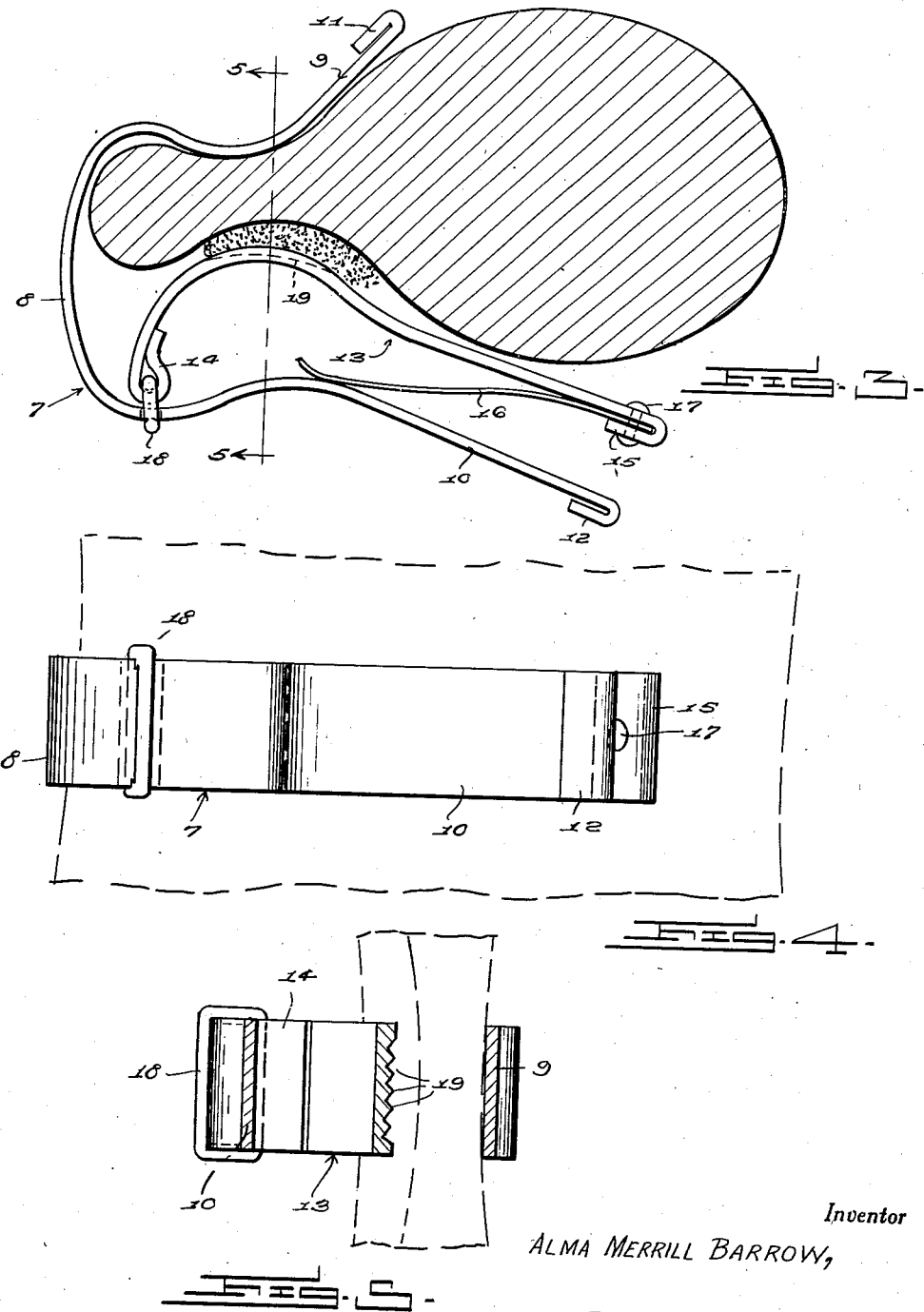

Patented Oct. 21, 1941

2,259,791

UNITED STATES PATENT OFFICE 2,259,791

COW TAIL HOLDER

Alma Merrill Barrow, Rigby, Idaho

Application March 26, 1940, Serial No. 326,081

4 Claims. (Cl. 119—105)

The present invention relates to new and useful improvements in cow tail holders and has for its primary object to provide a device of this character which may be readily and easily employed to prevent a cow from switching her tail against the head of a person while he is milking the cow.

Other objects of the invention are to provide a cow tail holder which will be durable, strong and reliable and which will not injure a cow when in use and which will be inexpensive to manufacture.

Still further objects and advantages of the invention will become apparent from a study of the following detailed description, taken in connection with the accompanying drawings wherein like characters of reference designate corresponding parts throughout the several views wherein:

Figure 1 is a fragmentary perspective view of an animal with a device embodying my invention shown in use thereon.

Figure 2 is a top plan view of the device.

Figure 3 is a transverse sectional view taken substantially on the line 3—3 of Fig. 1.

Figure 4 is a side elevational view of the device.

Figure 5 is a vertical transverse sectional view taken substantially on the line 5—5 of Figure 3.

Referring now to the drawings in detail, it will be seen that the reference numeral 7 designates generally a length of spring steel strap metal, or other suitable material, which is bent intermediate its ends to form an open loop 8 from which extends the arms 9 and 10. The arm 9 is shorter than the arm 10 and the free end of each arm is bent upon itself as shown in Fig. 2 of the drawings, to form the heads 11 and 12.

Hingedly secured to the open loop 8 at one side thereof is a curved lever generally referred to by the numeral 13. This curved lever 13 is constructed to provide an eye 14 at its pivoted end portion while its other end portion is bent upon itself as at 15.

One end portion of a curved leaf spring 16 is mounted between the bent portion 15 and the curved lever 13 and is held therebetween through the medium of a rivet 17.

A substantially rectangular shaped link 18 is mounted on the open loop 8 with one side portion thereof passing through the eye 14 of the curved lever 13.

The curved lever 13 is provided with teeth 19 as shown in Fig. 5 of the drawings.

When in use the device is held with the curved lever 13 swung against the arm 10 at which time the device may be placed on the back of a cow's leg with the cow's tail between the curved portion of the lever 13 and its leg. When in this position the lever is released and the action of the spring 16 causes the lever 13 to firmly hold the cow's tail against switching.

Although I have shown and described herein a preferred embodiment of my invention it is to be definitely understood that I do not desire to limit the application of the invention thereto and any change or changes may be made in the materials and in the structure and arrangement of the several parts, within the spirit of the invention as claimed.

What is claimed is:

1. A cow tail holder comprising an open looped member, arms extending from said open looped member, a link mounted on said open looped member, a curved lever pivotally secured to said link, and a leaf spring secured to said curved lever at one end portion and contacting the inner side of one of said arms at its other end portion for normally forcing said curved lever towards the other of said arms.

2. In a cow tail holder an open loop member adapted to be placed about the hock of a cow's leg, an arm extending from said open looped member at each side of said leg, a curved lever pivotally secured to the inner side of said open looped member, and spring means between said curved lever and one of said arms for forcing said curved lever towards said cow's leg with the cow's tail therebetween.

3. In a cow tail holder, an open loop member adapted to be placed about the hock of a cow's leg, an arm extending from said open looped member at each side of said leg, a link secured to said open loop member rearwardly of said arms, a toothed curved lever pivotally secured to said link, and spring means between said toothed curved lever and one of said arms for forcing said toothed curved lever towards said leg with the cow's tail therebetween.

4. In a device of the character described, a cow tail holder comprising a length of strap metal bent to form an open loop member adapted to be placed on the hock of a cow's leg, diverging arms extending forwardly from said open loop member and positioned at the sides of said leg, a link on said open loop member rearwardly of said diverging arms, a curved lever adjacent one of said diverging arms pivotally secured at one end portion to said link, and a leaf spring secured at one end to the other end portion of said curved lever and contacting said adjacent arm at its other end to normally urge said curved lever toward one side of said leg with a portion of a cow's tail therebetween.

ALMA MERRILL BARROW.